(12) United States Patent
Huang (10) Patent No.: US 11,018,741 B2
(45) Date of Patent: May 25, 2021

(54) WIRELESS COMMUNICATION DEVICE AND METHOD FOR SWITCHING ANTENNA

(71) Applicant: Beijing Xiaomi Mobile Software Co., Ltd., Beijing (CN)

(72) Inventor: Qianhong Huang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/553,262

(22) Filed: Aug. 28, 2019

(65) Prior Publication Data

US 2020/0076485 A1 Mar. 5, 2020

(30) Foreign Application Priority Data

Sep. 3, 2018 (CN) .......................... 201811023378.8

(51) Int. Cl.
*H04B 7/06* (2006.01)

(52) U.S. Cl.
CPC .......... *H04B 7/061* (2013.01); *H04B 7/0604* (2013.01); *H04B 7/0693* (2013.01)

(58) Field of Classification Search
CPC ........ H04B 7/0608; H04B 7/04; H04B 7/061; H04B 7/0604; H04B 7/0693
See application file for complete search history.

(56) References Cited

U.S. PATENT DOCUMENTS

| | | | | |
|---|---|---|---|---|
| 6,049,705 A | * | 4/2000 | Xue | H04B 7/10 |
| | | | | 455/277.1 |
| 2012/0112970 A1 | * | 5/2012 | Caballero | H01Q 7/00 |
| | | | | 343/702 |

FOREIGN PATENT DOCUMENTS

| | | |
|---|---|---|
| CN | 107707280 A | 2/2018 |
| CN | 107911126 A | 4/2018 |
| CN | 108429863 A | 8/2018 |

OTHER PUBLICATIONS

Extended European Search Report dated Nov. 20, 2019 in Patent Application No. 19194620.1, 78 pages.

* cited by examiner

*Primary Examiner* — Sung S Ahn
(74) *Attorney, Agent, or Firm* — Oblon, McClelland, Maier & Neustadt, L.L.P.

(57) ABSTRACT

The present disclosure relates to a wireless communication device and a method for switching an antenna of a wireless communication device that includes a first antenna in an operation state and a second antenna in a standby state. The method includes detecting a first performance parameter of the first antenna, the first performance parameter including at least one of a strength of a received signal at the first antenna and a sensitivity of the first antenna; and when the first performance parameter of the first antenna is lower than a preset threshold, switching the second antenna to the operation state, and switching the first antenna to the standby state. The technical solution can improve a communication quality of the wireless communication device by enabling a standby antenna when performance of an antenna in the operation state has been degraded.

3 Claims, 10 Drawing Sheets

WIRELESS COMMUNICATION DEVICE AND METHOD FOR SWITCHING ANTENNA

CROSS-REFERENCE TO RELATED APPLICATIONS

The present application is based on and claims priority to Chinese Patent Application No. 201811023378.8, filed on Sep. 3, 2018, the entire contents of which are incorporated herein by reference.

TECHNICAL FIELD

The present disclosure relates to the technical field of telecommunications, and more particularly to a wireless communication device and a method for switching an antenna.

BACKGROUND

Due to the relatively small size of a mobile phone, how and on which portion the user holds the mobile phone will have a significant impact on the performance of an antenna of the mobile phone. In some cases, there may be problems with the degradation of antenna performance that affect the quality of mobile communication.

SUMMARY

This Summary is provided to introduce a selection of aspects of the present disclosure in a simplified form that are further described below in the Detailed Description. This Summary is not intended to identify key features or essential features of the claimed subject matter, nor is it intended to be used to limit the scope of the claimed subject matter.

Aspects of the disclosure provide a method for switching an antenna of a wireless communication device that includes a first antenna in an operation state and a second antenna in a standby state. The method includes detecting a first performance parameter of the first antenna, the first performance parameter including at least one of a strength of a received signal at the first antenna and a sensitivity of the first antenna; and when the first performance parameter of the first antenna is lower than a preset threshold, switching the second antenna to the operation state, and switching the first antenna to the standby state.

According to an aspect, the method further includes detecting an operation posture of the wireless communication device; and determining whether the operation posture of the wireless communication device has been changed, wherein detecting the first performance parameter of the first antenna includes detecting the first performance parameter of the first antenna when it is determined that the operation posture of the wireless communication device has been changed.

In an example, the operation state of the first antenna is a primary operation state, and switching the second antenna to the operation state includes switching the second antenna to the primary operation state when the first performance parameter of the first antenna is lower than a first preset threshold.

According to an aspect, the wireless communication device further includes a third antenna, and an operation state of the third antenna is an auxiliary operation state. According to this aspect, the method further includes detecting a second performance parameter of the third antenna, the second performance parameter including at least one of a strength of a received signal at the third antenna and a sensitivity of the third antenna; and when the second performance parameter of the third antenna is lower than a second preset threshold, switching the third antenna to the standby state, and switching the first antenna to the auxiliary operation state.

According to another aspect, the operation state of the first antenna is an auxiliary operation state, and the wireless communication device further includes a third antenna, and an operation state of the third antenna is a primary operation state. According to this aspect, the method further includes detecting a second performance parameter of the third antenna, the second performance parameter of the third antenna including at least one of a strength of a received signal at the third antenna and a sensitivity of the third antenna; and switching the second antenna to the operation state includes switching the second antenna to the auxiliary operation state when the second performance parameter of the third antenna is not lower than a first preset threshold, and the first performance parameter of the first antenna is lower than a second preset threshold.

Aspects of the disclosure also provide a wireless communication device including a first antenna in an operation state, a second antenna in a standby state, a processor, and a memory for storing instructions executable by the processor. The processor is configured to detect a first performance parameter of the first antenna, the first performance parameter including comprising at least one of a strength of a received signal at the first antenna and a sensitivity of the first antenna; and when the first performance parameter of the first antenna is lower than a preset threshold, switch the second antenna to the operation state, and switch the first antenna to the standby state.

Aspects of the disclosure also provide a non-transitory computer-readable medium of a wireless communication device including a first antenna in an operation state and a second antenna in a standby state, the non-transitory computer-readable storage medium storing instructions that, when executed by one or more processors of the wireless communication device, cause the wireless communication device to detect a first performance parameter of the first antenna, the first performance parameter including comprising at least one of a strength of a received signal at the first antenna and a sensitivity of the first antenna; and when the first performance parameter of the first antenna is lower than a preset threshold, switch the second antenna to the operation state, and switch the first antenna to the standby state.

It is to be understood that both the foregoing general description and the following detailed description are illustrative and explanatory only and are not restrictive of the present disclosure.

BRIEF DESCRIPTION OF THE DRAWINGS

The accompanying drawings, which are incorporated in and constitute a part of this specification, illustrate aspects consistent with the disclosure and, together with the description, serve to explain the principles of the disclosure.

The specific aspects of the present disclosure, which have been illustrated by the accompanying drawings described above, will be described in detail below. These accompanying drawings and description are not intended to limit the scope of the present disclosure in any manner, but to explain the concept of the present disclosure to those skilled in the art via referencing specific aspects.

DETAILED DESCRIPTION

Reference will now be made in detail to exemplary aspects, examples of which are illustrated in the accompanying drawings. The following description refers to the accompanying drawings in which the same numbers in different drawings represent the same or similar elements unless otherwise represented. The implementations set forth in the following description of exemplary aspects do not represent all implementations consistent with the disclosure. Instead, they are merely examples of apparatuses and methods consistent with aspects related to the disclosure as recited in the appended claims.

Depending on how and on which portion the user holds the mobile phone, the performance of the antenna of the mobile phone is prone to be unstable and affect the communication quality of the mobile phone.

Aspects of the present disclosure provide a method for switching an antenna, which is applied to a wireless communication device. The wireless communication device includes a standby redundant antenna, and when performance of an antenna in the operation state drops to a certain extent, the redundant antenna is enabled to improve the communication quality for the mobile phone.

In the aspect of the present disclosure, the terms "first", "second" and the like are used to distinguish the same or similar items with substantially the same functions, and those skilled in the art can understand that the terms "first" and "second" do not limit the quantity and performing sequence.

The states of the antennas involved in the aspects of the present disclosure include an operation state and a standby state.

The operation state refers to a state in which an antenna can transmit or receive. The operation state includes a primary operation state and an auxiliary operation state. The primary operation state refers to a state in which an antenna is used as a primary antenna, and the antenna in the primary operation state is used for transmission and primary reception. The auxiliary operation state refers to a state in which an antenna is used as an auxiliary antenna, and the antenna in the auxiliary operation state is used for auxiliary reception.

The standby state refers to a state in which an antenna is neither transmitting nor receiving.

Figure 1:
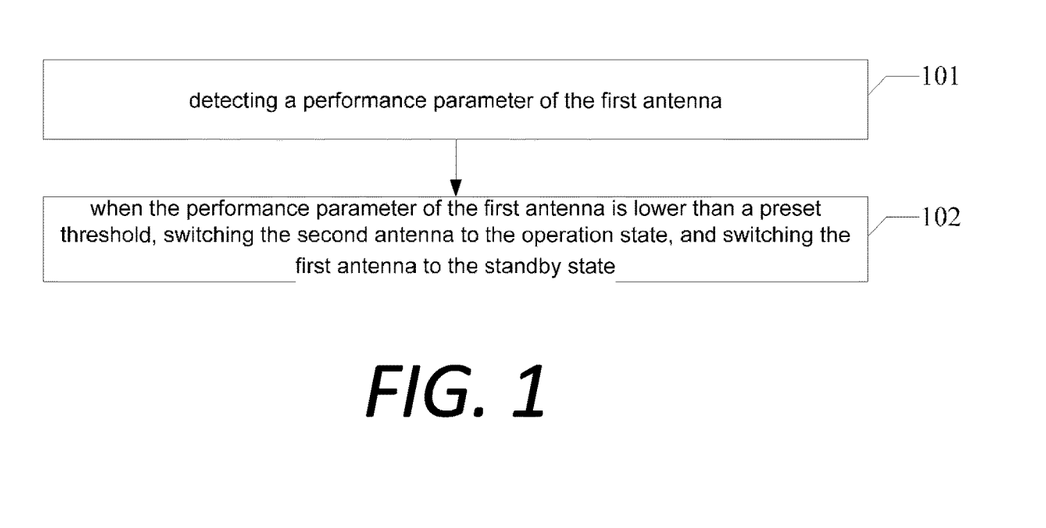
FIG. 1 is a flowchart of a method for switching an antenna according to an exemplary aspect of the present disclosure.

FIG. 1 is a flowchart of a method for switching an antenna according to an exemplary aspect, which is applied to a wireless communication device, including but not limited to a mobile phone, a tablet computer, a walkie-talkie, etc. The wireless communication device includes a first antenna and a second antenna. In an aspect of the present disclosure, communication quality can be improved by switching the operation state of the antenna. The state of an antenna can be switched back and forth between the operation state and the standby state. For convenience of explanation, the initial state of the first antenna is assumed as in the operation state, and the initial state of the second antenna is assumed as in the standby state.

The method for switching an antenna includes steps 101-102.

In step 101, a performance parameter of the first antenna is detected.

The performance parameter of the antenna in the operation state is detected. The performance parameter includes at least one of strength of a received signal and sensitivity, for indicating the performance of the antenna in the operation state. When the performance parameter is not lower than a preset threshold, it indicates that the performance of the antenna can meet the communication requirements. When the performance parameter is lower than the preset threshold, it indicates that the performance of the antenna has been degraded and the communication quality has been affected.

In step 102, when the performance parameter of the first antenna is lower than the preset threshold, the second antenna is switched to the operation state, and the first antenna is switched to the standby state.

When the performance parameter of the first antenna is lower than the preset threshold, the states of the first antenna and the second antenna are interchanged. The first antenna is switched from the operation state to the standby state, and the second antenna is switched from the standby state to the operation state.

The operation state includes a primary operation state and an auxiliary operation state. The preset threshold in this aspect may include a first preset threshold and a second preset threshold.

The first preset threshold is used to determine the performance of the antenna in the primary operation state. When the performance parameter of the antenna in the primary operation state is lower than the first preset threshold, it indicates that the performance of the antenna in the primary operation state has been degraded, and the communication quality has been affected.

The second preset threshold is used to determine the performance of the antenna in the auxiliary operation state. When the performance parameter of the antenna in the auxiliary operation state is lower than the second preset threshold, it indicates that the performance of the antenna in the auxiliary operation state has been degraded, and the communication quality has been affected.

The specific values of the first preset threshold and the second preset threshold may be experimentally measured empirical values, and the values of the two preset thresholds shave no fixed relationship in size.

The first antenna being switched from the auxiliary operation state to the standby state is taken as an example. In one aspect, the wireless communication device includes three antennas, a first antenna, a second antenna, and a third antenna, respectively. The first antenna is in the auxiliary operation state, the second antenna is in the standby state, and the third antenna is in the primary operation state.

When the performance of the antenna in the primary operation state is normal and the performance of the antenna in the auxiliary operation state has been degraded, the state of the antenna in the auxiliary operation state can be interchanged with the state of the antenna in the standby state. For example, when the performance parameter of the third antenna is not lower than the first preset threshold, and the performance parameter of the first antenna is lower than the second preset threshold, the second antenna is switched from the standby state to the auxiliary operation state, and the first antenna is switched from the auxiliary operation state to the standby state.

The method for switching an antenna provided by the aspect of the present disclosure is applied to a wireless communication device which includes a first antenna and a second antenna. While the first antenna is in the operation state, the second antenna is in the standby state, and when the performance of the first antenna has been degraded to a certain extent, the second antenna is switched to the operation state and the first antenna is switched to the standby state. Thereby it can improve the communication quality of the mobile phone by enabling the standby antenna when the performance of the antenna in the operation state has been degraded.

Figure 2:
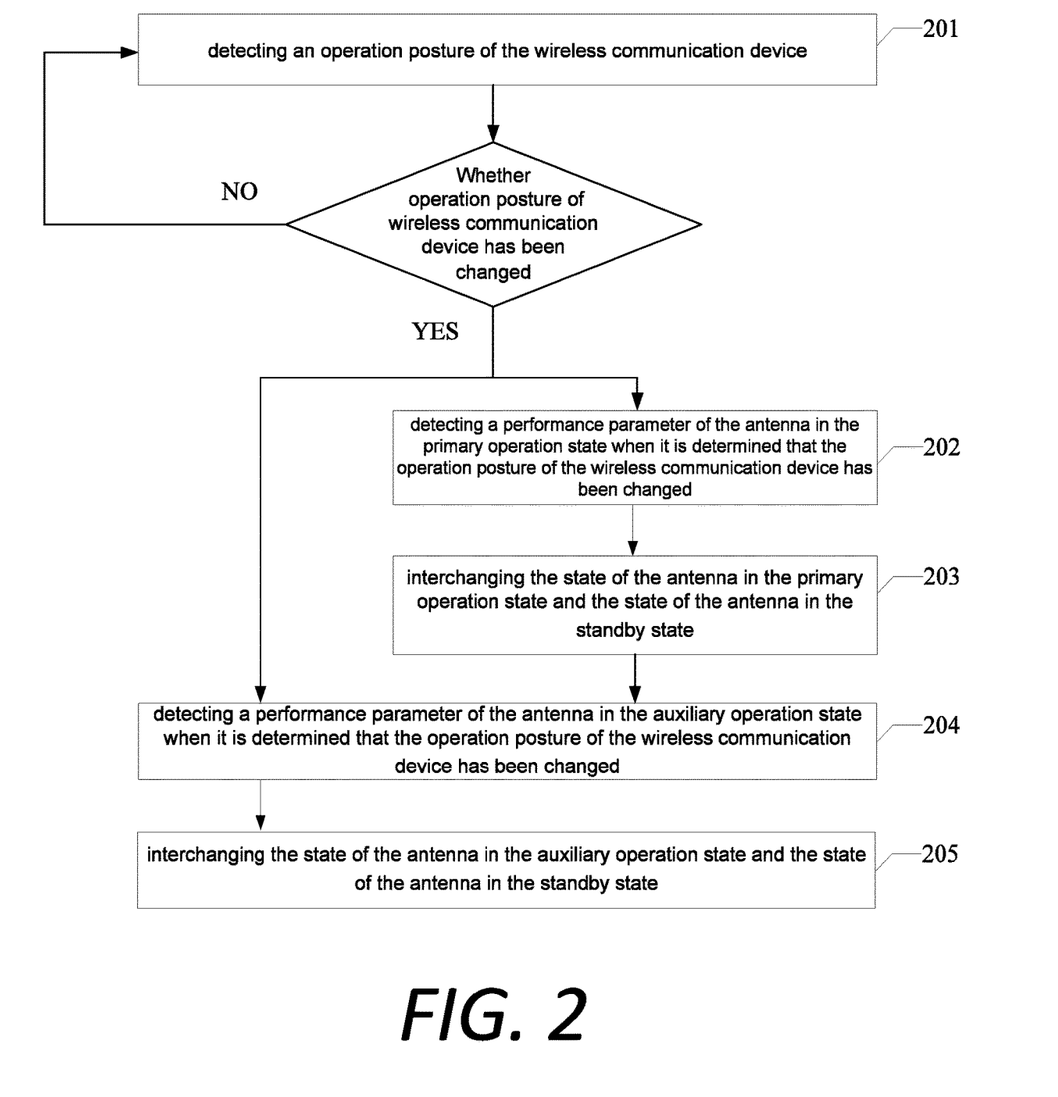
FIG. 2 is a flowchart of a method for switching an antenna according to an exemplary aspect of the present disclosure.

Based on the method for switching an antenna provided by the above aspect corresponding to FIG. 1, FIG. 2 is a flowchart of a method for switching an antenna according to an exemplary aspect. In the aspect corresponding to FIG. 2, the method for switching an antenna is further explained with reference to an example in which the states of antenna in the primary operation state and of the antenna in the auxiliary operation state are respectively interchanged with the state of the antenna in the standby state.

Some of the steps are the same as or similar to those of the aspect corresponding to FIG. 1, and only the different steps will be described in detail below.

Referring to FIG. 2, the method for switching an antenna provided in this aspect includes steps 201-205.

In step 201, an operation posture of the wireless communication device is detected.

The wireless communication device can include a sensor configured to detect operation posture of the wireless communication device. The operation posture refers to relative heights of various portions of the wireless communication device in space. Taking a mobile phone as an example, the operation posture includes a vertical screen posture, a horizontal screen posture, and an inverted posture.

In step 202, a performance parameter of the antenna in the primary operation state is detected when it is determined that the operation posture of the wireless communication device has been changed.

In one aspect, when it is detected that the operation posture of the wireless communication device has been changed, the detection of the performance parameter of the primary antenna is triggered.

Figure 3:
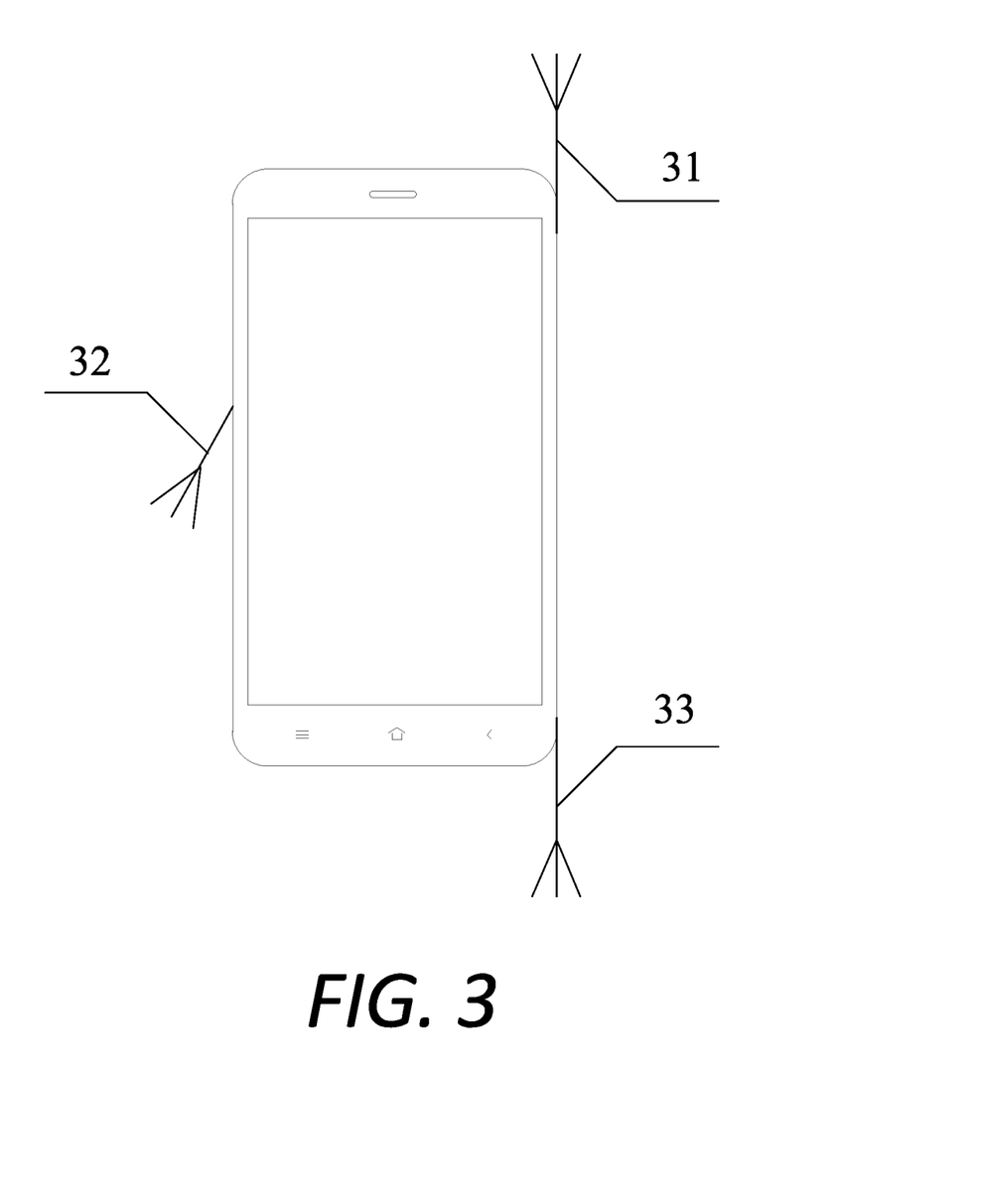
FIG. 3 is a schematic diagram of a wireless communication device according to an exemplary aspect of the present disclosure.

Taking the case where the wireless communication device is a mobile phone as an example, referring to FIG. 3, the wireless communication device includes a first antenna 31, and an initial state of the first antenna 31 is the primary operation state.

When the user changes the operation posture of the mobile phone, the portion where the user holds the mobile phone also changes, which may cause the parameter of the signal of the primary antenna to be degraded. Therefore, when the mobile phone detects that the operation posture has been changed, the mobile phone detects the performance parameter of the first antenna 31.

In step 203, the state of the antenna in the primary operation state is interchanged with the state of the antenna in the standby state.

When the performance parameter of the antenna in the primary operation state is lower than the first preset threshold, it indicates that the performance of the primary antenna has been degraded, and the communication quality has been affected. At this time, the antenna in the standby state is switched to the primary operation state.

Referring to FIG. 3, when the performance parameter of the first antenna 31 is lower than the first preset threshold, the second antenna 32 is switched from the standby state to the primary operation state, and the first antenna 31 is switched from the primary operation state to the standby state.

The state of one antenna can be switched back and forth between the primary operation state and the standby state. For example, after the second antenna 32 is switched from the standby state to the primary operation state, and the first antenna 31 is switched from the primary operation state to the standby state, when the performance parameter of the second antenna 32 is lower than the first preset threshold, the second antenna 32 can be switched back from the primary operation state to the standby state, and the first antenna 31 can be switched back from the standby state to the primary operation state.

In step 204, a performance parameter of the antenna in the auxiliary operation state is detected when it is determined that the operation posture of the wireless communication device has been changed.

There is no sequence between the step 204 and the step 202. For example, when it is determined that the operation posture of the wireless communication device has been changed, the performance parameter of the antenna in the primary operation state and the performance parameter of the antenna in the auxiliary operation state can be simultaneously detected. For another example, after the states of the antenna in the primary operation state and of the antenna in the standby state are interchanged, the process may go to step 204.

In step 205, the state of the antenna in the auxiliary operation state is interchanged with the state of the antenna in the standby state.

In one aspect, when the performance parameter of the antenna in the auxiliary operation state is lower than the second preset threshold, the antenna in the auxiliary operation state is switched to the standby state, and the antenna in the standby state is switched to the auxiliary operation state.

Referring to FIG. 3, the wireless communication device further includes a third antenna 33. The initial state of the third antenna 33 is the auxiliary operation state. After the state switching in step 203, the current state of the first antenna 31 is the standby state. When the performance parameter of the third antenna 33 is lower than the second preset threshold, the third antenna 33 is switched from the auxiliary operation state to the standby state, and the first antenna 31 is switched from the standby state to the auxiliary operation state.

The state of one antenna can be switched back and forth between the auxiliary operation state and the standby state. For example, after the third antenna 33 is switched from the auxiliary operation state to the standby state, and the first antenna 31 is switched from the standby state to the auxiliary operation state, when the performance parameter of the first antenna 31 is lower than the second preset threshold, the first antenna 31 may be can be switched back from the auxiliary operation state to the standby state, and the third antenna 33 can be switched back from the standby state to the auxiliary operation state.

Further, the state of one antenna can be switched back and forth between the primary operation state and the auxiliary operation state. For example, the initial state of the first antenna 31 is the primary operation state, and the initial state of the third antenna 33 is the auxiliary operation state. When the performance parameter of the third antenna 33 is greater than the performance parameter of the first antenna 31, the third antenna 33 can be switched from the auxiliary operation state to the primary operation state, and the first antenna 31 can be switched from the primary operation state to the auxiliary operation state.

The method for switching an antenna provided by the aspect of the present disclosure is applied to a wireless communication device including a first antenna and a second antenna. While the first antenna is in the operation state, and the second antenna is in the standby state, and when the performance of the first antenna has been degraded to a certain extent, the second antenna is switched to the operation state and the first antenna is switched to the standby state. Thereby it can improve the communication quality of the mobile phone by enabling the standby antenna when the performance of the antenna in the operation state has been degraded.

The following is a device aspect of the present disclosure, which may be configured to implement the method aspects of the present disclosure.

Figure 4:
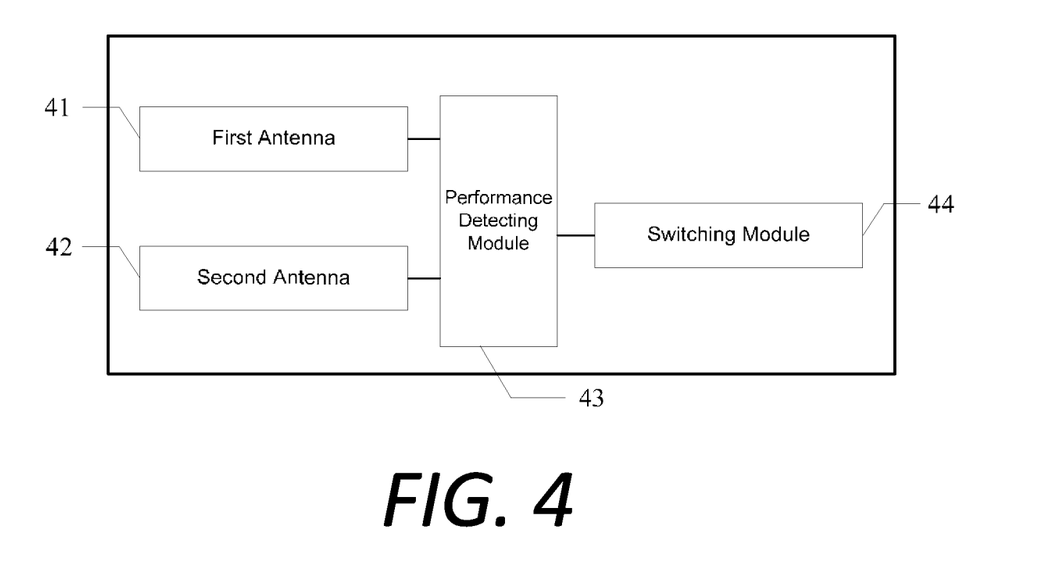
FIG. 4 is a block diagram of an electronic device according to an exemplary aspect of the present disclosure.

FIG. 4 is a block diagram of an electronic device according to an exemplary aspect. The device may implement some or all of its functions by software, hardware or a combination of both for performing the method for switching an antenna described in the aspects corresponding to FIGS. 1-3. As shown in FIG. 4, the electronic device includes:

a first antenna 41 in an operation state and a second antenna 42 in a standby state, a performance detecting module 43 configured to detect a performance parameter of the first antenna 41, the performance parameter including at least one of strength of a received signal and sensitivity; and a switching module 44 configured to, when the performance parameter of the first antenna 41 is lower than a preset threshold, switch the second antenna 42 to the operation state, and switch the first antenna 41 to the standby state.

Figure 5:
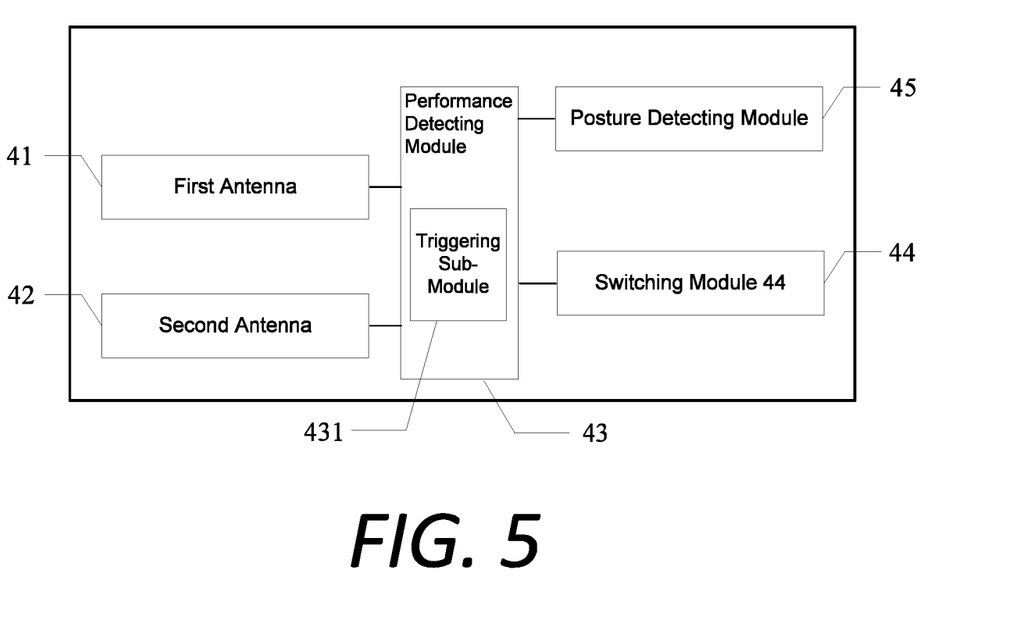
FIG. 5 is a block diagram of an electronic device according to an exemplary aspect of the present disclosure.

As shown in FIG. 5, in an aspect, the wireless communication device further includes: a posture detecting module 45 configured to detect an operation posture of the wireless communication device.

The performance detecting module 43 includes a triggering sub-module 431 configured to detect the performance parameter of the first antenna 41 when it is determined that the operation posture of the wireless communication device has been changed.

Figure 6:
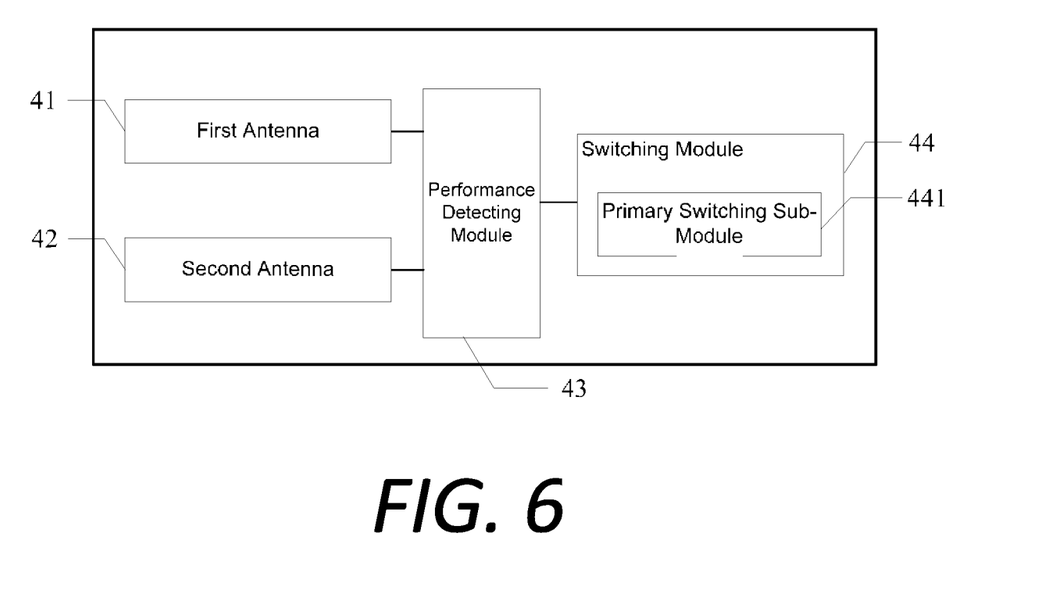
FIG. 6 is a block diagram of an electronic device according to an exemplary aspect of the present disclosure.

As shown in FIG. 6, in an aspect, the operation state of the first antenna 41 is a primary operation state.

The switching module 44 includes a primary switching sub-module 441 configured to, when the performance parameter of the first antenna 41 is lower than a first preset threshold, switch the second antenna 42 to the primary operation state.

Figure 7:
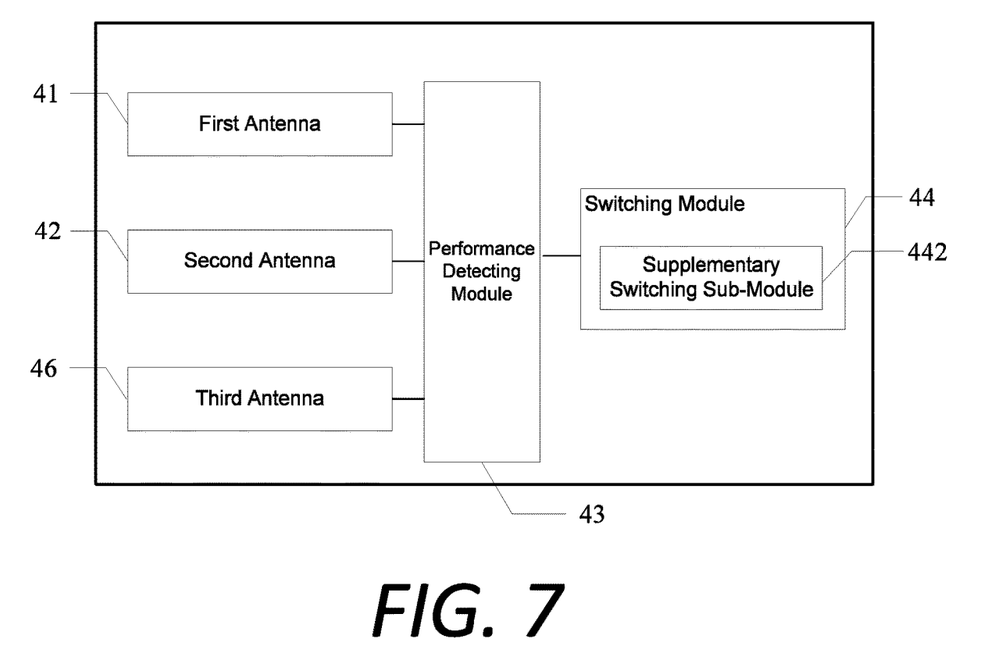
FIG. 7 is a block diagram of an electronic device according to an exemplary aspect of the present disclosure.

As shown in FIG. 7, in an aspect, the wireless communication device further includes a third antenna 46, wherein the operation state of the third antenna 46 is an auxiliary operation state.

The switching module 44 includes a supplementary switching sub-module 442 configured to, when the performance parameter of the third antenna 46 is lower than a second preset threshold, switch the third antenna 46 to the standby state, and switch the first antenna 41 to the auxiliary operation state.

Figure 8:
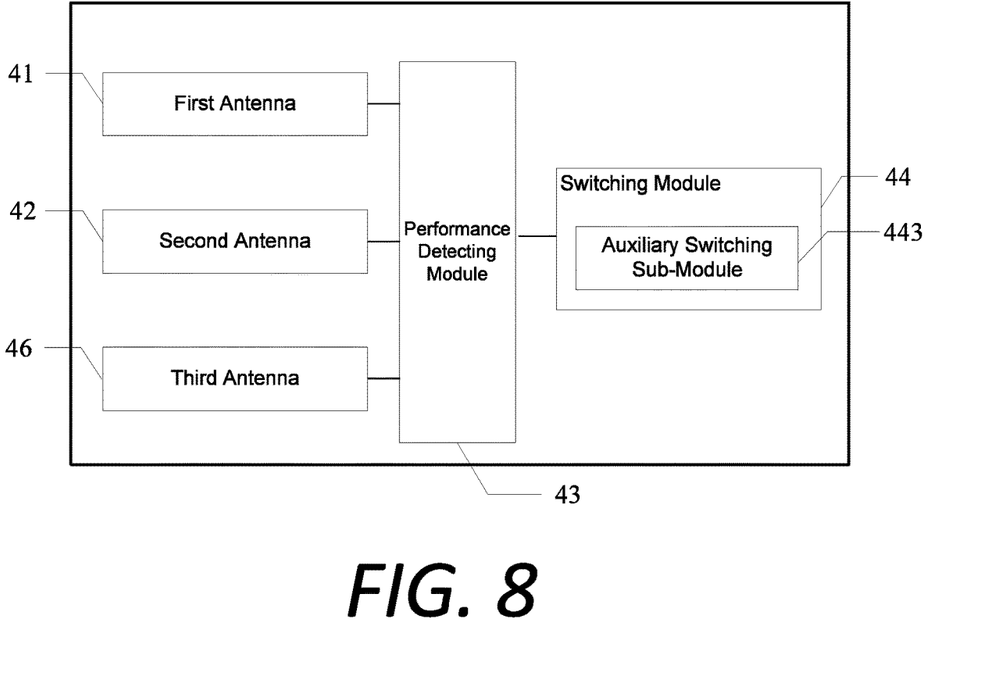
FIG. 8 is a block diagram of an electronic device according to an exemplary aspect of the present disclosure.

As shown in FIG. 8, in an aspect, the operation state of the first antenna 41 is an auxiliary operation state, the wireless communication device further includes a third antenna 46, and the operation state of the third antenna 46 is a primary operation state.

The switching module 44 includes an auxiliary switching sub-module 443 configured to, when the performance parameter of the third antenna 46 is not lower than a first preset threshold, and the performance parameter of the first antenna 41 is lower than a second preset threshold, switch the second antenna 42 to the auxiliary operation state.

The electronic device provided by the aspects of the present disclosure includes a first antenna and a second antenna. While the first antenna is in the operation state, the second antenna is in the standby state, and when the performance of the first antenna has been degraded to a certain extent, the second antenna is switched to the operation state and the first antenna is switched to the standby state. Thereby it can improve the communication quality of the mobile phone by enabling the standby antenna when the performance of the antenna in the operation state has been degraded.

Figure 9:
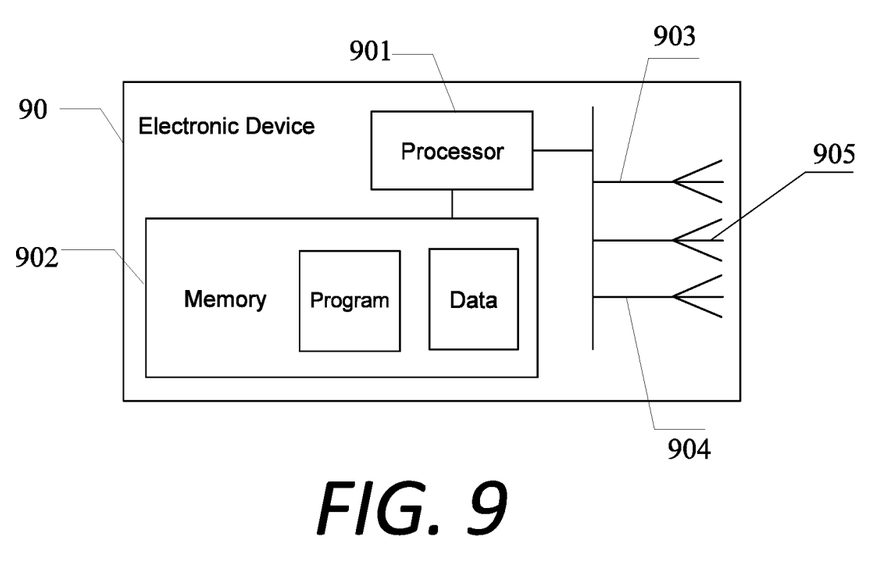
FIG. 9 is a block diagram of an electronic device according to an exemplary aspect of the present disclosure.

FIG. 9 is a block diagram of an electronic device according to an exemplary aspect. The device may implement some or all of its functions by software, hardware or a combination of both for performing the method for switching an antenna described in the aspects corresponding to FIGS. 1-3. As shown in FIG. 9, the electronic device 90 includes:

a processor 901; and a memory 902 for storing instructions executable by the processor 901.

The electronic device 90 further includes a first antenna 903 in an operation state and a second antenna 904 in a standby state.

The processor 901 is configured to:

detect a performance parameter of the first antenna 903, the performance parameter including at least one of strength of a received signal and sensitivity; and when the performance parameter of the first antenna 903 is lower than a preset threshold, switch the second antenna 904 to the operation state, and switch the first antenna 903 to the standby state.

In an aspect, the processor 901 may be further configured to:

detect an operation posture of the wireless communication device; and detect the performance parameter of the first antenna 903 when it is determined that the operation posture of the wireless communication device has been changed.

In an aspect, the processor 901 may be further configured to:

the operation state of the first antenna 903 is a primary operation state; and when the performance parameter of the first antenna 903 is lower than a first preset threshold, switch the second antenna 904 to the primary operation state.

In an aspect, the wireless communication device further includes a third antenna 905, and the operation state of the third antenna 905 is an auxiliary operation state, and the processor 901 may be further configured to:

when the performance parameter of the third antenna 905 is lower than a second preset threshold, switch the third antenna 905 to the standby state, and switch the first antenna 903 to the auxiliary operation state.

In an aspect, the operation state of the first antenna 903 is an auxiliary operation state, and the wireless communication device further includes a third antenna 905, and the operation state of the third antenna 905 is a primary operation state; and the processor 901 may be further configured to:

when the performance parameter of the third antenna 905 is not lower than a first preset threshold, and the performance parameter of the first antenna 903 is lower than a second preset threshold, switch the second antenna 904 to the auxiliary operation state.

The electronic device provided by the aspects of the present disclosure includes a first antenna and a second antenna. While the first antenna is in the operation state, the second antenna is in the standby state, and when the performance of the first antenna has been degraded to a certain extent, the second antenna is switched to the operation state and the first antenna is switched to the standby state. Thereby it can improve the communication quality of the mobile phone by enabling the standby antenna when the performance of the antenna in the operation state has been degraded.

Figure 10:
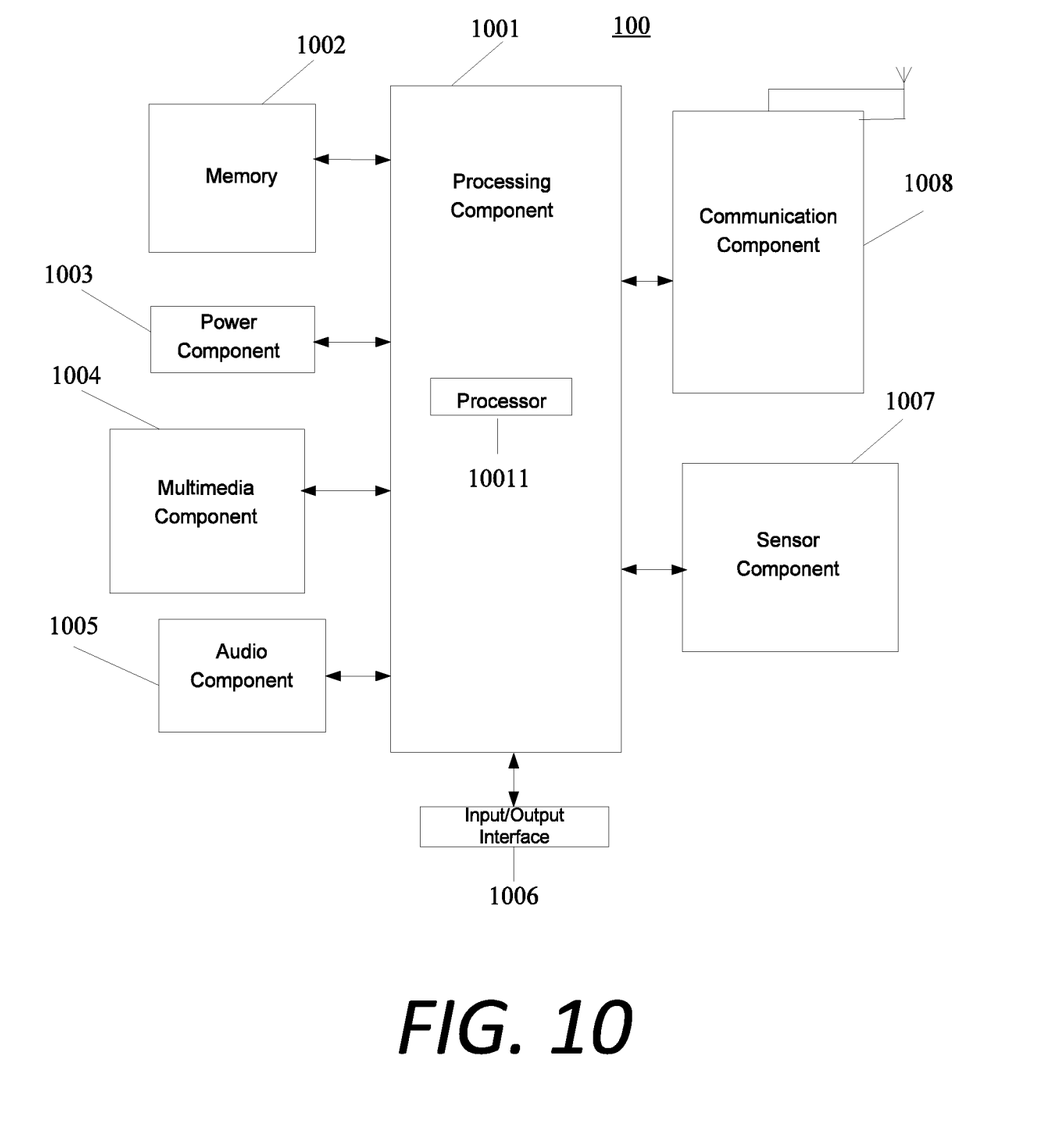
FIG. 10 is a block diagram of a terminal device according to an exemplary aspect of the present disclosure.

The electronic device provided by the aspect of the present disclosure may be a terminal device as shown in FIG. 10, and FIG. 10 is a block diagram of a terminal device according to an exemplary aspect. The terminal device 130 may be a smart phone, a tablet computer, etc. The terminal device 100 is configured to perform the method for switching an antenna described in the foregoing aspects corresponding to FIGS. 1 to 3.

The terminal device 100 may include one or more of the following components: a processing component 1001, a memory 1002, a power component 1003, a multimedia component 1004, an audio component 1005, an input/output (I/O) interface 1006, a sensor component 1007, and a communication component 1008.

The processing component 1001 typically controls overall operations of the terminal device 100, such as the operations associated with display, telephone calls, data communications, camera operations, and recording operations. The processing component 1001 may include one or more processors 10011 to execute instructions, to perform all or part of the steps of the above method. Moreover, the processing component 1001 may include one or more modules which facilitate the interaction between the processing component 1001 and other components. For instance, the processing component 1001 may include a multimedia module to facilitate the interaction between the multimedia component 1004 and the processing component 1001.

The memory 1002 is configured to store various types of data to support the operation of the terminal device 100. Examples of such data include instructions for any applications or methods operated on the terminal device 100, contact data, phonebook data, messages, pictures, video, etc. The memory 1002 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1003 provides power to various components of the terminal device 100. The power component 1003 may include a power management system, one or more power sources, and any other components associated with the generation, management, and distribution of power in the terminal device 100.

The multimedia component 1004 includes a screen providing an output interface between the terminal device 100 and the user. In some aspects, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some aspects, the multimedia component 1004 includes a front camera and/or a rear camera. The front camera and the rear camera may receive an external multimedia datum while the terminal device 100 is in an operation mode, such as a photographing mode or a video mode. Each of the front camera and the rear camera may be a fixed optical lens system or have focus and optical zoom capability.

The audio component 1005 is configured to output and/or input audio signals. For example, the audio component 1005 includes a microphone ("MIC") configured to receive an external audio signal when the terminal device 100 is in an operation mode, such as a call mode, a recording mode, and a voice recognition mode. The received audio signal may be further stored in the memory 1002 or transmitted via the communication component 1008. In some aspects, the audio component 1005 further includes a speaker to output audio signals.

The I/O interface 1006 provides an interface between the processing component 1001 and peripheral interface modules, such as a keyboard, a click wheel, buttons, and the like. The buttons may include, but are not limited to, a home button, a volume button, a starting button, and a locking button.

The sensor component 1007 includes one or more sensors to provide status assessments of various aspects of the terminal device 100. For instance, the sensor component 1007 may detect an open/closed status of the terminal device 100, relative positioning of components, e.g., the display and the keypad, of the terminal device 100, a change in position of the terminal device 100 or a component of the terminal device 100, a presence or absence of user contact with the terminal device 100, an orientation or an acceleration/deceleration of the terminal device 100, and a change in temperature of the terminal device 100. The sensor component 1007 may include a proximity sensor configured to detect the presence of nearby objects without any physical contact. The sensor component 1007 may also include a light sensor, such as a CMOS or CCD image sensor, for use in imaging applications. In some aspects, the sensor component 1007 may also include an accelerometer sensor, a gyroscope sensor, a magnetic sensor, a pressure sensor, or a temperature sensor.

The communication component 1008 is configured to facilitate communication, wired or wirelessly, between the terminal device 100 and other devices. The communication component 1008 can be provided with a plurality of antennas including a first antenna, a second antenna, and a third antenna. The terminal device 100 can access a wireless network based on a communication standard, such as Wireless-Fidelity (WiFi), 3G, 4G or 5G, or a combination thereof. In one exemplary aspect, the communication component 1008 receives a broadcast signal or broadcast associated information from an external broadcast management system via a broadcast channel. In one exemplary aspect, the communication component 1008 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary aspects, the terminal device 100 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, to perform the method for switching an antenna corresponding to the aspects as shown in FIGS. 1-3.

In exemplary aspects, there is also provided a non-transitory computer-readable storage medium including instructions, such as included in the memory 1002, executable by the processor 10011 in the terminal device 100 to perform the above method. For example, the non-transitory computer-readable storage medium may be a ROM, a RAM, a CD-ROM, a magnetic tape, a floppy disc, an optical data storage device, and the like. When instructions in the storage medium are executed by the processor 10011 of the terminal device 100, causes the terminal device 100 to perform the method for switching an antenna corresponding to the aspects as shown in FIGS. 1-3. The method includes:

detecting a performance parameter of the first antenna, the performance parameter including at least one of strength of a received signal and sensitivity; and when the performance parameter of the first antenna is lower than a preset threshold, switching the second antenna to the operation state, and switching the first antenna to the standby state.

In an aspect, the method for switching an antenna further includes: detecting an operation posture of the wireless communication device; and detecting a performance parameter of the first antenna including: detecting the performance parameter of the first antenna when it is determined that the operation posture of the wireless communication device has been changed.

In an aspect, the operation state of the first antenna is a primary operation state; and when the performance parameter of the first antenna is lower than a preset threshold, switching the second antenna to the operation state including:

when the performance parameter of the first antenna is lower than a first preset threshold, switching the second antenna to the primary operation state.

In an aspect, the wireless communication device further includes a third antenna, and the operation state of the third antenna is an auxiliary operation state, and the method for switching an antenna further includes:

when the performance parameter of the third antenna is lower than a second preset threshold, switching the third antenna to the standby state, and switching the first antenna to the auxiliary operation state.

In an aspect, the operation state of the first antenna is an auxiliary operation state, and the wireless communication device further includes a third antenna, and the operation state of the third antenna is a primary operation state; and when the performance parameter of the first antenna is lower than a preset threshold, switching the second antenna to the operation state including:

when the performance parameter of the third antenna is not lower than a first preset threshold, and the performance parameter of the first antenna is lower than a second preset threshold, switching the second antenna to the auxiliary operation state.

In the terminal device and the storage medium provided by the aspects of the present disclosure, while the first antenna is in the operation state, the second antenna is in the standby state, and when the performance of the first antenna has been degraded to a certain extent, the second antenna is switched to the operation state and the first antenna is switched to the standby state. Thereby it can improve the communication quality of the mobile phone by enabling the standby antenna when the performance of the antenna in the operation state has been degraded.

It is noted that the various modules, sub-modules, units, and components in the present disclosure can be implemented using any suitable technology. For example, a module may be implemented using circuitry, such as an integrated circuit (IC). As another example, a module may be implemented as a processing circuit executing software instructions.

Other aspects of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the disclosure only be limited by the appended claims.

What is claimed is:

1. A method for switching an antenna of a wireless communication device that includes a first antenna in an operation state, a second antenna in a standby state, and a third antenna in the operation state, the method comprising:
   detecting a first performance parameter of the first antenna, the first performance parameter including at least one of a strength of a received signal at the first antenna and a sensitivity of the first antenna;
   when the first performance parameter of the first antenna is lower than a preset threshold, switching the second antenna to the operation state, and switching the first antenna to the standby state;
   detecting an operation posture of the wireless communication device; and
   determining whether the operation posture of the wireless communication device has been changed,
   wherein detecting the first performance parameter of the first antenna includes detecting the first performance parameter of the first antenna when it is determined that the operation posture of the wireless communication device has been changed,
   wherein the operation state is a state in which an antenna can transmit or receive, the operation state includes a primary operation state and an auxiliary operation state, the primary operation state is a state in which an antenna is used as a primary antenna, the antenna in the primary operation state is used for transmission and primary reception, the auxiliary operation state is a state in which an antenna is used as an auxiliary antenna, the antenna in the auxiliary operation state is used for auxiliary reception, the standby state is a state in which an antenna is neither transmitting nor receiving, wherein when the operation state of the first antenna is the primary operation state, and the operation state of the third antenna is an auxiliary operation state, and when switching the second antenna to the operation state includes switching the second antenna to the primary operation state when the first performance parameter of the first antenna is lower than a first preset threshold, the method further comprises: detecting a second performance parameter of the third antenna, the second performance parameter including at least one of a strength of a received signal at the third antenna and a sensitivity of the third antenna; and when the second performance parameter of the third antenna is lower than a second preset threshold, switching the third antenna to the standby state, and switching the first antenna to the auxiliary operation state, and wherein when the operation state of the first antenna is the auxiliary operation state, and the operation state of the third antenna is the primary operation state, the method further comprises: detecting a second performance parameter of the third antenna, the second performance parameter of the third antenna including at least one of a strength of a received signal at the third antenna and a sensitivity of the third antenna, wherein switching the second antenna to the operation state includes switching the second antenna to the auxiliary operation state when the second performance parameter of the third antenna is not lower than a first preset threshold, and the first performance parameter of the first antenna is lower than a second preset threshold.

2. A wireless communication device, comprising:
a first antenna in an operation state;
a second antenna in a standby state;
a third antenna in the operation state;
a processor; and
a memory for storing instructions executable by the processor,
wherein the processor is configured to:
  detect a first performance parameter of the first antenna, the first performance parameter including comprising at least one of a strength of a received signal at the first antenna and a sensitivity of the first antenna;
  when the first performance parameter of the first antenna is lower than a preset threshold, switch the second antenna to the operation state, and switch the first antenna to the standby state;
  detect an operation posture of the wireless communication device; and
  determine whether the operation posture of the wireless communication device has been changed,
  wherein, when detecting the first performance parameter of the first antenna, the processor is further configured to detect the first performance parameter of the first antenna when it is determined that the operation posture of the wireless communication device has been changed,
  wherein the operation state is a state in which an antenna can transmit or receive, the operation state includes a primary operation state and an auxiliary operation state, the primary operation state is a state in which an antenna is used as a primary antenna, the antenna in the primary operation state is used for transmission and primary reception, the auxiliary operation state is a state in which an antenna is used as an auxiliary antenna, the antenna in the auxiliary operation state is used for auxiliary reception, the standby state is a state in which an antenna is neither transmitting nor receiving, wherein when the operation state of the first antenna is the primary operation state, and the operation state of the third antenna is an auxiliary operation state, and when switching the second antenna to the operation state includes switching the second antenna to the primary operation state when the first performance parameter of the first antenna is lower than a first preset threshold, the processor is further configured to: detect a second performance parameter of the third antenna, the second performance parameter including at least one of a strength of a received signal at the third antenna and a sensitivity of the third antenna; and when the second performance parameter of the third antenna is lower than a second preset threshold, switch the third antenna to the standby state, and switching the first antenna to the auxiliary operation state, and wherein when the operation state of the first antenna is the auxiliary operation state, and the operation state of the third antenna is the primary operation state, the processor is further configured to: detect a second performance parameter of the third antenna, the second performance parameter of the third antenna including at least one of a strength of a received signal at the third antenna and a sensitivity of the third antenna, wherein switching the second antenna to the operation state includes switching the second antenna to the auxiliary operation state when the second performance parameter of the third antenna is not lower than a first preset threshold, and the first performance parameter of the first antenna is lower than a second preset threshold.

3. A non-transitory computer-readable medium of a wireless communication device including a first antenna in an operation state, a second antenna in a standby state, and a third antenna in the operation state, the non-transitory computer-readable storage medium storing instructions that, when executed by one or more processors of the wireless communication device, cause the wireless communication device to:
  detect a first performance parameter of the first antenna, the first performance parameter including comprising at least one of a strength of a received signal at the first antenna and a sensitivity of the first antenna;
  when the first performance parameter of the first antenna is lower than a preset threshold, switch the second antenna to the operation state, and switch the first antenna to the standby state;
  detect an operation posture of the wireless communication device; and
  determine whether the operation posture of the wireless communication device has been changed,
  wherein, when detecting the first performance parameter of the first antenna, the instructions further cause the wireless communication device to detect the first performance parameter of the first antenna when it is determined that the operation posture of the wireless communication device has been changed,
  wherein the operation state is a state in which an antenna can transmit or receive, the operation state includes a primary operation state and an auxiliary operation state, the primary operation state is a state in which an antenna is used as a primary antenna, the antenna in the primary operation state is used for transmission and primary reception, the auxiliary operation state is a state in which an antenna is used as an auxiliary antenna, the antenna in the auxiliary operation state is used for auxiliary reception, the standby state is a state in which an antenna is neither transmitting nor receiving, wherein when the operation state of the first antenna is the primary operation state, and the operation state of the third antenna is an auxiliary operation state, and when switching the second antenna to the operation state includes switching the second antenna to the primary operation state when the first performance parameter of the first antenna is lower than a first preset threshold, the instructions further cause the wireless communication device to: detect a second performance parameter of the third antenna, the second performance parameter including at least one of a strength of a received signal at the third antenna and a sensitivity of the third antenna; and when the second performance parameter of the third antenna is lower than a second preset threshold, switch the third antenna to the standby state, and switching the first antenna to the auxiliary operation state, and wherein when the operation state of the first antenna is the auxiliary operation state, and the operation state of the third antenna is the primary operation state, the instructions further cause the wireless communication device to: detect a second performance parameter of the third antenna, the second performance parameter of the third antenna including at least one of a strength of a received signal at the third antenna and a sensitivity of the third antenna, wherein switching the second antenna to the operation state includes switching the second antenna to the auxiliary operation state when the second performance parameter of the third antenna is not lower than a first preset threshold, and the first performance parameter of the first antenna is lower than a second preset threshold.

* * * * *